(12) United States Patent
Wigren et al.

(10) Patent No.: US 11,595,071 B2
(45) Date of Patent: Feb. 28, 2023

(54) CONTROLLING TRANSMITTER OUTPUT

(71) Applicant: Telefonaktiebolaget LM Ericsson (publ), Stockholm (SE)

(72) Inventors: Torbjörn Wigren, Uppsala (SE); Christer Törnevik, Solna (SE); Björn Thors, Rättvik (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 17/044,833

(22) PCT Filed: Mar. 25, 2019

(86) PCT No.: PCT/SE2019/050263
§ 371 (c)(1),
(2) Date: Oct. 1, 2020

(87) PCT Pub. No.: WO2019/194721
PCT Pub. Date: Oct. 10, 2019

(65) Prior Publication Data
US 2021/0099195 A1 Apr. 1, 2021

Related U.S. Application Data

(60) Provisional application No. 62/654,279, filed on Apr. 6, 2018.

(51) Int. Cl.
*H04B 7/06* (2006.01)
*H04B 1/3827* (2015.01)
(Continued)

(52) U.S. Cl.
CPC ......... *H04B 1/3838* (2013.01); *H04B 7/0695* (2013.01); *H04W 52/367* (2013.01); *H04W 72/042* (2013.01)

(58) Field of Classification Search
USPC ........................................................ 370/252
See application file for complete search history.

(56) References Cited

U.S. PATENT DOCUMENTS 9,225,396 B2* 12/2015 Maltsev ................ H04W 52/36
2007/0046539 A1* 3/2007 Mani ..................... H04B 7/0691
342/383
(Continued)

FOREIGN PATENT DOCUMENTS

WO WO-2016048231 A1 * 3/2016 ........... H04B 7/0417
WO 2018/056876 A1 3/2018

OTHER PUBLICATIONS

Afthoni, et al., "Proportional Derivative Control Based Robot Art System Using Microsoft Kinect," 2013 International Conference on Robotics, Biomimetics, Intelligent Computational Systems, IEEE, Nov. 25, 2013, pp. 24-29.

(Continued)

Primary Examiner — Jeffrey M Rutkowski
Assistant Examiner — Luna Weissberger
(74) Attorney, Agent, or Firm — Nicholson De Vos Webster & Elliott LLP

(57) ABSTRACT

Methods, apparatus and computer programs are disclosed for controlling the output of a transmission point. One embodiment provides a method for controlling the output of a transmission point for a wireless communications network. The method includes determining an average output power of the transmission point, in a particular direction, over a period of time, comparing the average output power to an output power reference value, and allocating data, to be transmitted by the transmission point in the particular direction to one or more wireless devices, to a pool of radio resources. The pool of radio resources is adjusted as a
(Continued)

function of the comparison between the average output power and the output power reference value.

19 Claims, 8 Drawing Sheets

(51) Int. Cl.
  *H04W 52/36* (2009.01)
  *H04W 72/04* (2023.01)

(56) References Cited

U.S. PATENT DOCUMENTS

2009/0054018 A1* 2/2009 Waheed ............... H03G 3/3047
                                                                        455/127.1
2018/0279365 A1* 9/2018 Wang ................ H04W 74/0808

OTHER PUBLICATIONS

International Search Report and Written Opinion, PCT App. No. PCT/SE2019/050263, dated Jul. 15, 2019, 17 pages.
International Preliminary Report on Patentability, PCT App. No. PCT/SE2019/050263, dated Oct. 15, 2020, 13 pages.

* cited by examiner

CONTROLLING TRANSMITTER OUTPUT

CROSS-REFERENCE TO RELATED APPLICATIONS

This application is a national stage of International Application No. PCT/SE2019/050263, filed Mar. 25, 2019, which claims the benefit of U.S. Provisional Application No. 62/654,279, filed Apr. 6, 2018, which are hereby incorporated by reference.

TECHNICAL FIELD

Embodiments of the present disclosure relate to wireless communication, and particularly relate to methods, apparatus and computer programs for controlling the output of a transmission point.

BACKGROUND

When any radio equipment is to be deployed, regulatory radio frequency (RF) exposure regulations need to be accounted for. These exposure limitations are typically based on the guidelines from the International Commission on Non-Ionizing Radiation Protection (ICNIRP) but may take different forms in different countries and regions. The aim of the RF exposure regulations is to ensure that human exposure to RF energy is kept within safe limits, which have typically been set with wide safety margins.

Transmission points for wireless communication networks are increasingly being equipped with advanced antenna systems (AAS). These antenna systems increase the capacity and/or coverage of existing wireless systems by addition of an antenna array. This enables the simultaneous transmission of parallel data streams between a base station and a user, so called multiple-input-multiple-output (MIMO) transmission. In some cases, like when millimeter-wave (mmVV) carrier frequencies are used, the main desired effect is rather to enhance coverage by exploiting the high beamforming gain of the new AAS systems.

A consequence of the increasing beamforming gain is that the radiated energy is concentrated in beams, in which the effective radiated power is increased as compared to the situation without AAS systems. The RF exposure limits are typically expressed in terms of power density ($W/m^2$) which in the far field is proportional to the effective isotropic radiated power (EIRP), i.e. the power radiated from an antenna with unity antenna gain in all directions. Consequently, the EIRP can be used to determine the power density in the far field. This implies that at a given distance from the antenna, and in the far field, the experienced momentary EIRP and power density will be higher in a beam generated by an AAS system with beam forming gain, than without such an AAS system.

The ICNIRP and other RF exposure limitations are usually expressed as an average power density over a specified time interval T. This means that the momentary or instantaneous power density can be higher than the specified limit, but the sustained power density must be below the limit. It will further be understood that the power density varies inversely (or decays) with distance from the transmitter. The distance from the transmitter at which the specified limit is met is referred to as the "compliance distance". To maintain a certain RF exposure compliance distance, which is shorter than that obtained using the maximum momentary EIRP of the AAS, the time-averaged power needs to be maintained at or below a pre-determined threshold.

SUMMARY

The present disclosure provides methods, apparatus and computer programs which seek to mitigate these and other problems.

In one aspect, there is provided a method for controlling the output of a transmission point for a wireless communications network. The method comprises: determining an average output power of the transmission point, in a particular direction, over a period of time; comparing the average output power to an output power reference value; and allocating data, to be transmitted by the transmission point to one or more wireless devices in the particular direction, to a pool of radio resources. The pool of radio resources is adjusted as a function of the comparison between the average output power and the output power reference value.

In a further aspect, the disclosure provides a network node configured to perform the method recited above.

A further aspect provides a computer program for performing the method recited above. A computer program product, comprising the computer program, is also provided.

Another aspect provides a network node for the output of a transmission point for a wireless communications network, the network node comprising processing circuitry and a non-transitory machine-readable medium storing instructions which, when executed by the processing circuitry, cause the network node to: determine an average output power of the transmission point, in a particular direction, over a period of time; compare the average output power to an output power reference value; and allocate data, to be transmitted by the transmission point to one or more wireless devices in the particular direction, to a pool of radio resources. The pool of radio resources is adjusted as a function of the comparison between the average output power and the output power reference value.

A further aspect provides a network node for the output of a transmission point for a wireless communications network. The network node comprises: a determining module configured to determine an average output power of the transmission point, in a particular direction, over a period of time; a comparing module configured to compare the average output power to an output power reference value; and an allocation module configured to allocate data, to be transmitted by the transmission point to one or more wireless devices in the particular direction, to a pool of radio resources. The pool of radio resources is adjusted as a function of the comparison between the average output power and the output power reference value.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
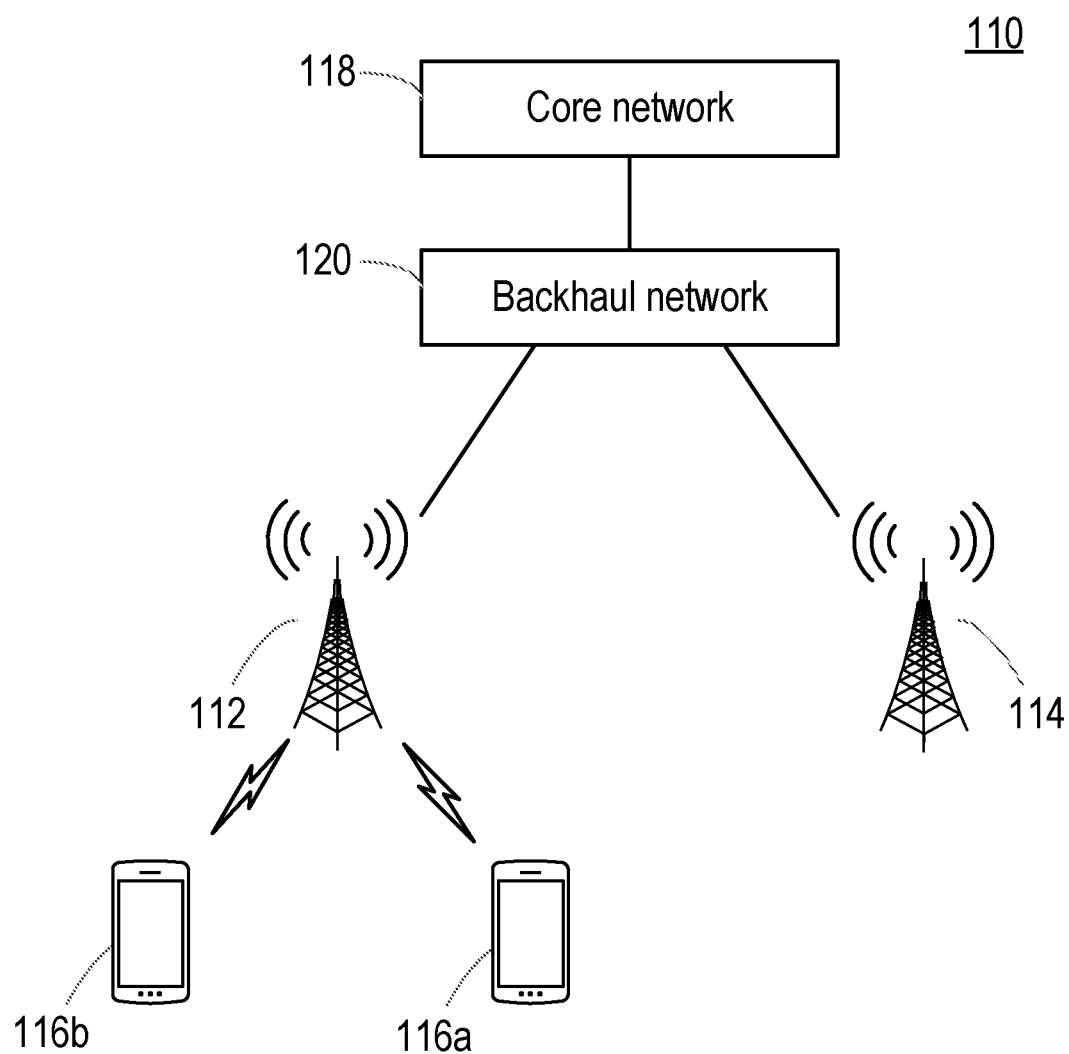
FIG. 1 is a schematic diagram of a wireless communication network according to embodiments of the disclosure.

FIG. 1 shows a communication network 110 according to embodiments of the disclosure.

The network 110 may at least partly be based on radio access technologies such as e.g. 3GPP Long Term Evolution (LTE), LTE-Advanced, Evolved Universal Terrestrial Radio Access Network (E-UTRAN), Universal Mobile Telecommunications Service (UMTS), Global System for Mobile (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some options. The network 110 may be suitable for providing radio communications meeting one or more of the criteria established by the Next Generation Mobile Networks Alliance for the 5th generation of mobile telecommunications standards. In one embodiment, therefore, the communication network 110 may be a wireless cellular network.

The network 110 comprises one or more radio access nodes 112, 114. In the illustrated embodiment, two radio access nodes 112, 114 are shown, but the skilled person will appreciate that any number of radio access nodes may be provided.

The radio access nodes 112, 114 may be referred to as e.g. base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

The functions of the radio access nodes 112, 114 may be distributed across one or more physical nodes. For example, each radio access node may be divided logically into more than one unit, comprising one or more of the following: a centralized unit (CU), a distributed unit and a radio unit (RU), remote radio head (RRH) or transmission point (TP).

Each radio access node 112, 114 may serve one or more cells of the network 110. Within each cell, wireless devices communicate with the respective radio access node to provide services to users of the devices as will be familiar to those skilled in the art. Each radio access node 112, 114 further communicates with a core network 118 via a backhaul network 120, in order to co-ordinate and control the network 110, and provide access to other parts of the network 110 (e.g. devices in other cells, not illustrated). In FIG. 1, two wireless devices 116*a*, 116*b* (collectively, 116) are shown in communication with radio access node 112.

The wireless devices 116 may also be known as user equipments (UEs), mobile devices, mobile terminal devices, wireless terminal devices, etc.

Transmissions between the radio access node 112 and the wireless devices 116 may be enhanced using beamforming techniques. Those skilled in the art will be familiar with beamforming, but further information is provided in the appendix. On the transmitter side, an antenna array comprising a plurality of antenna elements can be controlled, through the application of phase and amplitude shifts to each antenna element, to transmit more strongly in certain directions and less strongly in other directions. The phase and amplitude shifts result in constructive interference between signals transmitted by each antenna element in the preferred direction, and destructive interference in other directions. For example, beamforming techniques may be utilized by the radio access node 112 to transmit in certain directions and so increase the received power density experienced by a particular wireless device 116. For this purpose, the radio access node 112 may have access to a plurality of sets of amplitude and phase shifts, known as a codebook, with each set defining a particular transmission beam. For example, the codebook may define a plurality of beams oriented in different directions, or with different widths, etc.

Those skilled in the art will further appreciate that wireless signals are transmitted between the radio access node 112 and the wireless devices 116 using radio resources which are scheduled according to one or more scheduling algorithms. A scheduler may be provided in the radio access node 112 or logically coupled to the radio access node for this purpose. As used herein, "radio resources" refers to any available resource which can be used to transmit wireless signals, such as frequency (e.g. one or more frequency channels or sub-channels), time (e.g. one or more frames, sub-frames, time slots, etc) or codes (e.g. as used for code-division multiplexing).

Thus, for downlink communications (i.e. from the radio access node 112 to the wireless devices 116), a pool of available radio resources is distributed for transmissions to the wireless devices 116 according to a scheduling algorithm. Various scheduling algorithms are known in the art, and the present disclosure is not limited in that respect. Suitable examples include round robin, fair queuing, proportionally fair scheduling and maximum throughput.

Those skilled in the art will appreciate that the output power of a radio access node varies as a function of the resources it uses for transmissions. For example, when the radio access node is scheduled to transmit using a relatively large amount of resources at any one time (e.g. a relatively large number of frequencies), the output power of that radio access node will also be relatively high; when the radio access node is scheduled to transmit using relatively few resources at any one time (e.g. a relatively low number of frequencies), the output power of that radio access node will be relatively low. Those skilled in the art will further appreciate that the output power of a radio access node can also be controlled through amplification or attenuation of the transmit signals in radio time-frequency resources, or by dynamically adapting the number of power amplifiers used to generate the transmitted signals.

Embodiments of the present disclosure utilize this property to control the output of a transmission point (e.g. a radio access node) of a wireless communications network. In one embodiment, the output of the transmission point is controlled so that a regulatory RF exposure requirement is met.

The radio access node is thus provided with a pool of radio resources with which to schedule transmissions to the wireless devices 116. Embodiments of the disclosure apply limitations to this pool of radio resources so as to limit the output power of the radio access node or transmission point in any particular direction. For example, the radio access node may be permitted to utilize only a fraction of its available pool of radio resources for scheduling transmissions to wireless devices 116 in each particular direction.

As used herein, the solid angle of a particular beam is approximately defined by the following selection of ranges in azimuth ($\varphi$ and elevation ($\theta$)

$$\Omega_{i,j}=[\varphi_i,\varphi_{i+1}]\times[\theta_j,\theta_{j+1}], i=0,\ldots,N-1, j=0,\ldots,M-1.$$

Figure 2:
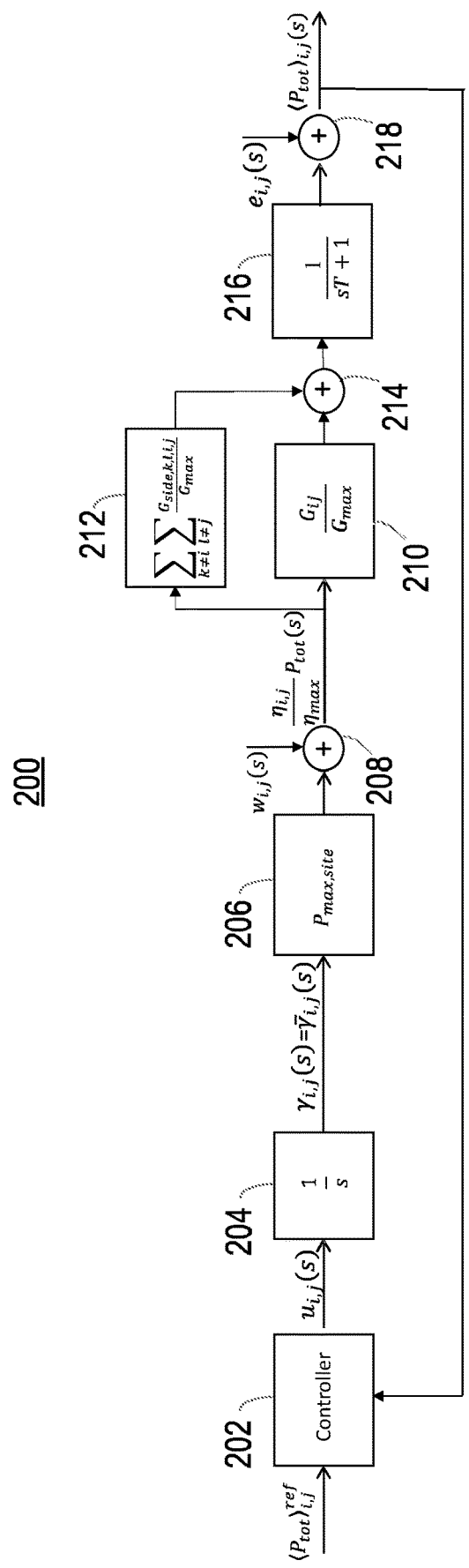
FIG. 2 is a schematic diagram of a feedback control mechanism according to embodiments of the disclosure.

FIG. 2 is a schematic diagram of a feedback control mechanism 200 according to embodiments of the disclosure. The control mechanism 200 may be implemented in a radio access node or transmission point, such as the radio access node 112 described above.

The control mechanism 200 according to embodiments of the disclosure is applied to transmissions in a particular direction from the radio access node or transmission point. Separate control mechanisms run in parallel, for each direction, such that control is applied to the transmit power of the transmission point or radio access node in each direction along which a beam may be transmitted.

In the illustrated embodiment, the mechanism 200 comprises the following blocks: a controller 202; an adjuster 204; a transmission power calculator 206; a first adding element 208; a main lobe gain calculator 210; a side lobe gain calculator 212; a second adding element 214; an averaging block 216; and a third adding element 218. The first and third adding elements are optional, and one or both of the first and third adding elements may be omitted in particular embodiments.

The controller 202 receives a feedback signal which is representative of the average output power of the transmission point in a particular direction (denoted by the indices i and j) $\langle P_{tot}\rangle_{i,j}(s)$, as well as an output power reference value $\langle P_{tot}\rangle_{i,j}^{ref}$. This output power reference value may be set with reference to a maximum averaged regulatory power $\langle P_{max,regulatory}\rangle$ that has been pre-determined to meet a regulatory RF exposure requirement. For example, in one embodiment the output power reference value $\langle P_{tot}\rangle_{i,j}^{ref}$ is the maximum averaged regulatory power $\langle P_{max,regulatory}\rangle$; in other embodiments, the output power reference value $\langle P_{tot}\rangle_{i,j}^{ref}$ may be set below the maximum averaged regulatory power $\langle P_{max,regulatory}\rangle$. The controller compares the two values and generates a control signal in a manner which will be described in more detail below. In one embodiment, the controller 202 implements a proportional-derivative control scheme when generating the control signal.

In the illustrated embodiment, the control signal $u_{i,j}(s)$ is indicative of a required change in the pool of radio resources for use in scheduling transmissions in the direction defined by i and j. It will be noted here that s is the Laplace transform variable (which is closely related to the angular frequency used in Fourier transforms). Thus the control signal commands adjustments to $\gamma_{i,j}$, making it increase or decrease. Separate control signals (and corresponding adjustments) may be provided for each direction i,j. The dynamics of the actuator mechanism is therefore $$\dot{\gamma}_{i,j}(t)=u_{i,j}(t), i=0,\ldots,N-1, j=0,\ldots M-1.$$

where $\gamma_{i,j}(t)$, i=0, ..., N−1, j=0, ..., M−1 are the fractional limitations applied to the pool of available radio resources for scheduling in the direction i,j, and where $u_{i,j}(t)$, i=0, ..., N−1, j=0, ..., M−1 are the control signals further discussed below. t denotes continuous time. Those skilled in the art will appreciate that the control mechanism may alternatively be implemented in discrete time, e.g., using the Euler approximation or the Tustin approximation. The scheduler may then limit the number of radio resources (e.g., frequency resources such as physical resource blocks, PRBs) it uses, or limit any other quantity that correlates well with the momentary output power.

This control signal is provided to the adjuster 204, which integrates the signal to generate a signal $\gamma_{i,j}(t)$ indicative of the pool of radio resources to be used for scheduling purposes. This signal may be subjected to upper and lower limits to generate a limited signal $\overline{\gamma_{i,j}}(t)$.

The maximum value of $\gamma_{i,j}(t)$ is 1.0 since it expresses a fraction of the total available scheduler resources. In some embodiments, the lower value of $\gamma_{i,j}(t)$ may also be limited, to prevent the feedback control mechanism from reducing it to an unphysical value below 0.0, or below some lower value $\gamma_{low}$ which prevents correct operation of the transmission point. The following limitation may therefore be applied to the signals:

$$\gamma_{low} \leq \gamma_{i,j}(t) \leq 1.0$$

This limited signal is provided to the transmission power calculator 206, which converts the fractional limitation on the pool of total available radio resources into an output power, based on the maximum total power of the transmission point $P_{max,site}$. It will be seen from the description below with respect to FIGS. 4 and 5 that scheduling of data to the limited pool of radio resources also occurs in this block.

The output power is provided to the first adding element 208 together with a disturbing quantity representative of predicted power errors $w_{i,j}(t)$. The output of the first adding element 208 is thus representative of the instantaneous output power of the transmission point $P_{tot}(s)$, modified by a proportion with which radio resources are utilized for scheduling in the direction i,j. This proportion is defined in FIG. 2 as the ratio $$\frac{\eta_{i,j}}{\eta_{max}},$$

where $\eta_{i,j}$ is the momentary (e.g. instantaneous) number of radio resources utilized for transmitting in the direction i,j, while $\eta_{max}$ is the maximum number of radio resources available for utilization.

This quantity is then provided to gain calculators 210, 212. The main lobe gain calculator 210 determines a factor based on the antenna gain for the main lobe in the direction i,j (that is, where the main lobe of a transmission beam is the primary direction in which the transmission beam is oriented). In the illustrated embodiment this factor is given by $$\frac{G_{i,j}}{G_{max}},$$

where $G_{i,j}$ is the main lobe antenna gain in the direction i,j and $G_{max}$ is the maximum antenna gain. The side lobe gain calculator 212 determines a factor based on the antenna gain for the side lobes of transmission beams oriented in directions other than the direction i,j. In the illustrated embodiment this factor is given by $$\Sigma_{k\neq i}\Sigma_{l\neq j}\frac{G_{side\,i,j,k,l}}{G_{max}},$$

where $G_{side,i,j,k,l}$ is the side lobe antenna gain in the direction i,j for a transmission beam whose main lobe is in direction k,l. This quantity is thus summed for all solid angles not equal to i,j.

The outputs of the gain calculators 210, 212 are provided to the second adding element 214, which adds them and outputs a signal which is indicative of the momentary transmit power in the direction i,j. This signal is then averaged in the averaging block 216 to account for the fact that the regulatory RF exposure requirement is expressed in terms of a time-averaged value. For example, the averaging block 216 may implement the averaging according to any suitable algorithm or model. In the illustrated embodiment, the averaging block 216 implements an autoregressive simplified model of the averaging $1/(sT+1)$, where T is the averaging time. The output of the averaging block 216 is provided to the third adding element 218, which adds it to a quantity e(s) representative of a measurement or prediction error. For example, e(s) may be equal to an averaged total power measurement error. The output of the third adding element 218 is thus equal to the average total output power of the transmission point in the direction i,j: $\langle P_{tot}\rangle_{i,j}(s)$. This quantity is fed back to the controller 202 for use as described above.

As noted above, in some embodiments, the controller 202 may implement a proportional-derivative control scheme. In this case, the control signal generated by the controller 202 may be given by $$u_{i,j}(s)=C_{i,j}T(1+T_{D,i,j}s)(\langle P_{tot}\rangle_{i,j}{}^{ref}-\langle P_{tot}\rangle_{i,j}(s)).$$

This controller is of proportional-derivative (PD) type. $C_{i,j}$ denotes the proportional gain, and $T_{D,i,j}$ the differentiation time. Since it is not known which average utilization is to be expected, nor which average antenna gains that are to be used, a gain factor of $K_{i,j}<1$ is applied in the forthcoming analysis to capture the effects of $\eta_{i,j}$, $\eta_{max}$ $G_{i,j}$, $G_{side,k,l,i,j}$ and $G_{max}$.

Following standard procedures of automatic control the poles of the closed loop system of FIG. 2 are given by the following second order equation $$s^2+(1/T+P_{max,site}K_{i,j}C_{i,j}T_{D,i,j})s+P_{max,site}K_{i,j}C_{i,j}=0.$$

These poles govern the closed loop dynamics of the feedback control mechanism, the actuator mechanism, and the averaged power. In order to determine the proportional gain and the differentiation time, a closed loop polynomial with desired poles in $-\alpha_1$ and $-\alpha_2$ is specified, independent of i,j, as $$s^2+(\alpha_1+\alpha_2)s+\alpha_1\alpha_2=0.$$

An identification of coefficients and solution of the resulting system of equations reveal that the proportional gain and differentiation time shall be selected as $$C_{i,j}=\frac{\alpha_1\alpha_2}{K_{i,j}P_{max,site}},$$

$$T_D=\frac{\alpha_1+\alpha_2-\frac{1}{T}}{\alpha_1\alpha_2}.$$

Note that $C_{i,j}$ compensates for the gain variation with the direction, while the differentiation time is not dependent on the direction.

A reason for this choice is that a system with two negative real poles can be expected to be well damped, which is a result of a significant differentiation action. This differentiation action is particularly beneficial in providing fast backoff close to the determined threshold, thus preventing inadvertent excessive output power.

To implement the feedback control mechanism $\langle P_{tot}\rangle^{ref}$, $\langle P_{tot}\rangle(t)$ and $\langle \dot{P}_{tot}\rangle(t)$ may be determined. The first two quantities can be obtained as described above, while the third quantity may be estimated. This can be done, for example, by autoregressive filtering of $\langle P_{tot}\rangle(t)$. One suitable autoregressive filter may be as follows:

$$\langle \dot{P}_{tot}\rangle_{i,j}(s)=\frac{\alpha s}{s+\alpha}\langle P_{tot}\rangle_{i,j}(s).$$

In order to further emphasize the back-off control performance it may be beneficial to allow only differential control action that reduces the scheduler threshold $\gamma_{i,j}(t)$, meaning that only negative contributions from the second term of the feedback mechanism should be allowed. This means that in the time domain, the following restriction to the derivative $\langle \dot{P}_{tot}\rangle_{i,j}(t)$ is applied $$u_{i,j}(t)=C_{i,j}T(\langle P_{tot}\rangle_{i,j}{}^{ref}-\langle P_{tot}\rangle_{i,j}(t))-C_{i,j}TT_D\max(0,\langle\dot{P}_{tot}\rangle_{i,j}(t)).$$

In some embodiments, a hard back-off may be applied selectively to the control signal to prevent inadvertent and momentary overshoot of the maximum averaged regulatory power. Thus, the fractional limitation applied to the pool of total radio resources may be set to a predetermined value (e.g. its minimum value $\gamma_{low}$) when the following condition is satisfied:

$$\langle P_{tot}\rangle_{i,j}(t)>\text{margin}\cdot\langle P_{max,regulatory}\rangle$$

where margin is a value slightly below 1 and where $\langle P_{max,regulatory}\rangle$ is the maximum averaged regulatory power (which may be the same as or greater than the output power reference value $\langle P_{tot}\rangle_{i,j}{}^{ref}$).

In further embodiments, the control mechanism illustrated in FIG. 2 and described above may be selectively enabled and disabled based on the average output power of the radio access node or transmission point. For example, when the average output power is relatively low, far from the maximum averaged regulatory power $\langle P_{max,regulatory}\rangle$, the control mechanism may be disabled. Conversely, when the average output power is relatively high, close to the maximum averaged regulatory power $\langle P_{max,regulatory}\rangle$, the control mechanism may be enabled to ensure that the average output power remains below the maximum average regulatory power $\langle P_{max,regulatory}\rangle$. For example:

The control mechanism may be turned on when $\langle P_{tot}\rangle_{i,j}(t)>\delta_1 P_{max,site}$, and may set $\gamma(t)=1.0$.

The control mechanism may be turned off when $\langle P_{tot}\rangle_{i,j}(t)<\delta_2 P_{max,site}$.

The values may fulfil the following condition: $\delta_2 P_{max,site}\leq \langle P_{tot}\rangle_{i,j}{}^{ref}\leq\delta_1 P_{max,site}$.

Figure 3:
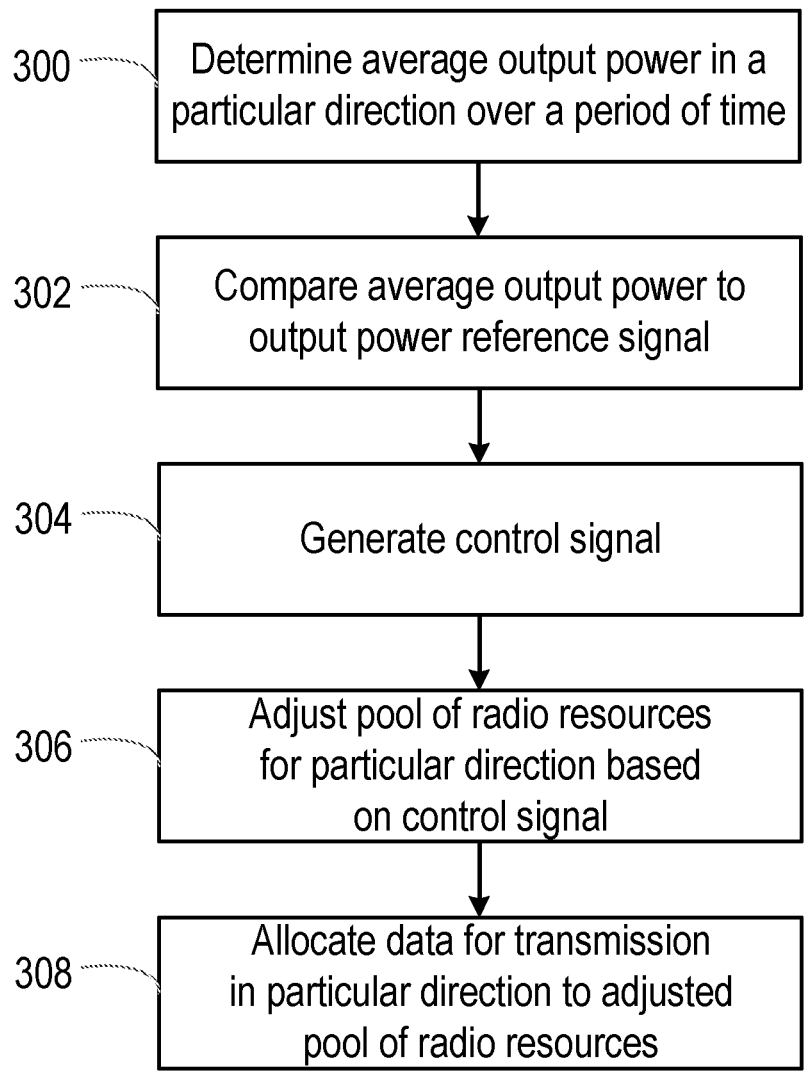
FIG. 3 is a flowchart of a method according to embodiments of the disclosure.

FIG. 3 is a flowchart of a method according to embodiments of the disclosure. The method may be implemented in a network node, such as the radio access node 112 described above. Alternatively, the method may be implemented in a scheduler within or logically coupled to such a radio access node.

The method begins in step 300, in which the average output power of the radio access node over a period of time, in a particular direction, is determined. The directional output power may be determined based on the total output power of the radio access node, which can be determined by measurement or prediction.

The total output power may be determined by measurement, e.g. of radio signals, just prior to transmission via the antenna or antenna array. In one embodiment this can be done by couplers that measure the radio signal amplitude at each signal path to an antenna element. These amplitudes can then be combined into a total output power of the radio, with the antenna gain removed.

Based on such measurements, the averaged power in a particular direction can be constructed by integration as $$\langle P_{tot}\rangle_{i,j}(t) = \frac{1}{T}\int_{t-T}^{t} \frac{\eta_{i,j}(\tau)}{\eta_{max}} \frac{G_{i,j}(\tau)}{G_{max}} P_{tot}(\tau)d\tau +$$

$$\sum_{i\neq k=0}^{N-1}\sum_{j\neq l=0}^{M-1} \frac{1}{T}\int_{t-T}^{t} \frac{\eta_{k,l}(\tau)}{\eta_{max}} \frac{G_{side,k,l,i,j}}{G_{max}} P_{tot}(\tau)d\tau$$

In this equation $\langle P_{tot}\rangle_{i,j}(t)$ is the average power quantity for direction i,j, $\eta_{i,j}(t)$ is the momentary scheduled resource utilization in direction i,j, (e.g. the number of PRBs or the amount of scheduled power), $\eta_{lmax}$ is the maximum momentary scheduled resources, $G_{i,j}(t)$ is the momentary (main lobe) antenna gain in direction i,j, $G_{max}$ is the maximal antenna gain, $G_{side,k,l,i,j}(t)$ is the momentary side lobe gain from direction k,l, to direction i,j, and $P_{tot}(t)$ is the momentary measured total power in the radio. This means that all quantities are transformed back to relate to the maximum radiated power in one single direction. When a single user exploits all resources and applies the maximum gain of the antenna array, the above equation collapses to the average of $P_{tot}(t)$, as desired.

Here $P_{tot}(T)$ is the total measured power in the radio at time z (where z is a dummy integration time variable), t is the current time and T is the averaging time specified in the regulation.

Alternatively, the total output power of the radio access node may be predicted using information available in the scheduler or elsewhere in base band. For example, the estimated output power may be obtained based on the fraction of radio resources (e.g., PRBs) in use at one time, and then averaging this quantity over a period of time. Thus the momentary scheduled power as estimated by the fraction of PRBs used at each time instant may be summed over the time T.

This approach is however subject to a number of errors. These include e.g. the actual power needed for re-transmissions, signal scaling and quantization errors, as well as errors caused by radio signal processing close to the antenna, including e.g. clipping to achieve peak to average power reductions.

In step 302, the determined average output power is compared to an output power reference signal value $\langle P_{tot}\rangle_{i,j}^{ref}$. This output power reference value may be set with reference to a maximum averaged regulatory power $\langle P_{max,regulatory}\rangle$ that has been predetermined to meet a regulatory RF exposure requirement. For example, in one embodiment the output power reference value $\langle P_{tot}\rangle_{i,j}^{ref}$ is the maximum averaged regulatory power $\langle P_{max,regulatory}\rangle$; in other embodiments, the output power reference value $\langle P_{tot}\rangle_{i,j}^{ref}$ may be set below the maximum averaged regulatory power $\langle P_{max,regulatory}\rangle$.

In step 304, a control signal is generated based on the comparison in step 302. The control signal may be generated using a similar mechanism to that described above with respect to FIG. 2. For example, in one embodiment, the control signal is indicative of a change, or a rate of change, to a pool of radio resources available to the scheduler for downlink transmissions to one or more wireless devices in the direction i,j.

The control signal may be generated according to a proportional derivative control scheme, which has at least one component which is proportional to the difference between the output power reference value and the average output power, and at least one component which is proportional to the time derivative of the difference between the output power reference value the average output power.

The radio access node has a total pool of radio resources with which to schedule transmissions to one or more wireless devices (e.g. wireless devices 116 served by the radio access node). In step 306, this pool of radio resources, as used for transmissions in the direction i,j, is adjusted based on the control signal. For example, the control signal may be indicative of (or used to calculate) a fraction of the pool of radio resources or a rate of change of the fraction of the pool of radio resources. By applying this fraction to the pool of resources, an adjusted pool of resources is generated which may be reduced in size compared to the total pool of radio resources. Depending on the state of the feedback control scheme, the adjustment to the pool of resources may be positive or negative.

Thus the scheduler is provided with an adjusted pool of resources which is less than the total pool of radio resources which would otherwise be available to it. The adjusted pool of resources may be formulated based on the total pool of radio resources, but with a fraction of the resources removed. For example, the number of frequency resources (e.g. PRBs, sub-channels, etc) may be reduced by removing a number of resources at higher frequencies, or lower frequencies, or removing frequency resources which are distributed through the bandwidth of the pool of resources (e.g. every nth resource may be removed, where n is an integer).

In step 308, this adjusted pool of radio resources is used to schedule transmissions to one or more wireless devices in the direction i,j. Thus data which is available to the radio access node for transmission to the one or more wireless devices in the direction i,j is assigned or allocated to resources in the adjusted pool of radio resources. One or more scheduling algorithms may be utilized for this purpose. Various scheduling algorithms are known in the art, and the present disclosure is not limited in that respect. Suitable examples include round robin, fair queuing, proportionally fair scheduling and maximum throughput.

The radio access node may then proceed to transmit wireless signals to the one or more wireless devices according to the scheduled resources in the direction i,j. In some embodiments the method shown in FIG. 3 is iterative. Thus, the average output power of the radio access node is again determined (i.e. as described with respect to step 300), and compared to an output power reference value. Thus the method may continue to adjust the pool of radio resources and so adjust the output power of the radio access node.

Further, the method may be performed separately for multiple or all directions. Thus separate control signals may be generated based on the output power reference value $\langle P_{tot}\rangle_{i,j}^{ref}$ and the determined average output power for different directions.

Figure 4:
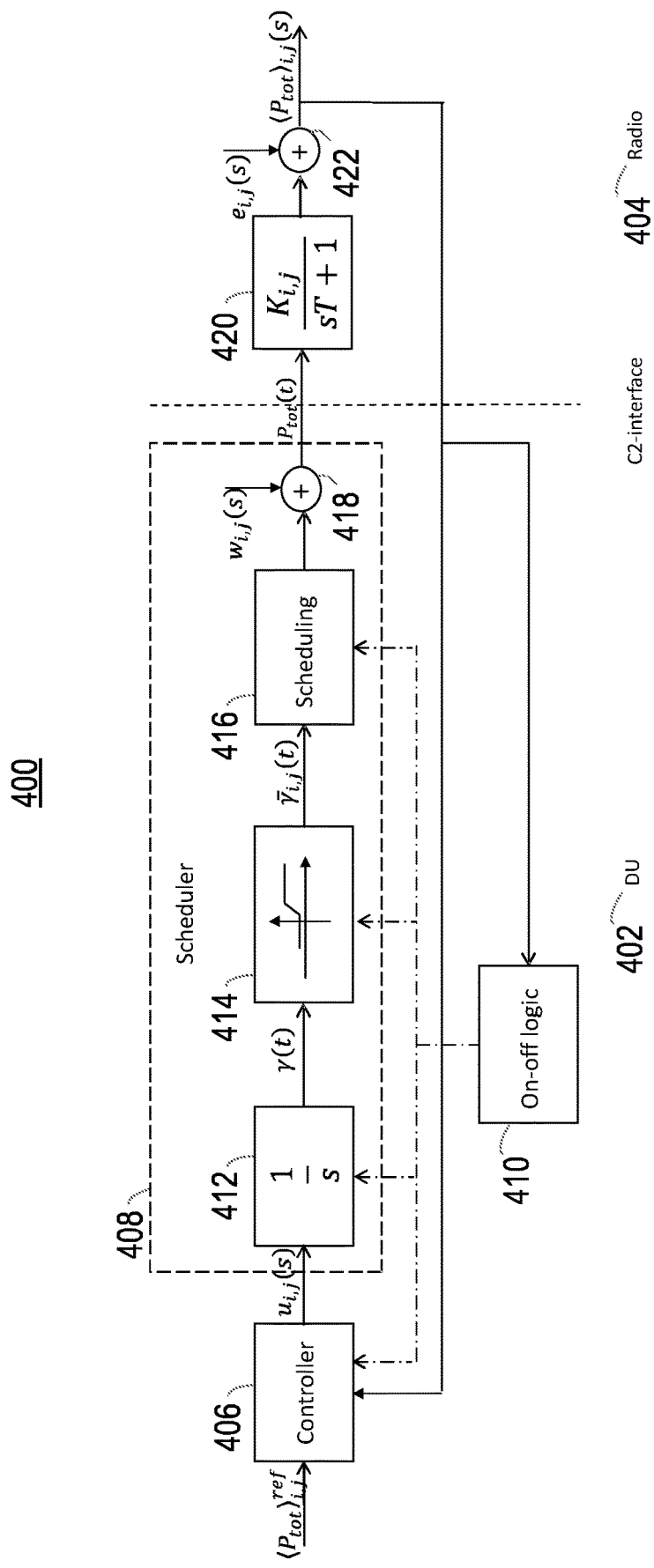
FIG. 4 shows a transmitter arrangement according to embodiments of the disclosure.

FIG. 4 shows a transmitter arrangement 400 according to embodiments of the disclosure.

In the illustrated embodiment, the transmitter arrangement 400 comprises a digital unit (DU) 402 and a radio unit 404, coupled to each other via a suitable interface. In the illustrated embodiment, this interface is termed a C2 interface. The DU 402 comprises a controller 406, a scheduler 408 and on/off logic 410.

It will be seen that the transmitter arrangement 400 implements a control mechanism as illustrated in and described above with respect to FIG. 2. Thus the controller 406 receives a feedback signal which is representative of the average output power of the transmission point in a particular direction i,j $\langle P_{tot}\rangle_{i,j}(s)$, as well as an output power reference value $\langle P_{tot}\rangle_{i,j}^{ref}$. This output power reference value may be set with reference to a maximum averaged regulatory power $\langle P_{max,regulatory}\rangle$ that has been pre-determined to meet a regulatory RF exposure requirement. For example, in one embodiment the output power reference value $\langle P_{tot}\rangle_{i,j}^{ref}$ is the maximum averaged regulatory $\langle P_{tot}\rangle_{i,j}^{ref}$ may be set below the maximum averaged regulatory power $\langle P_{max,regulatory}\rangle$. The controller compares the two values and generates a control signal $u_{i,j}(s)$. In one embodiment, the controller 406 implements a proportional-derivative control scheme when generating the control signal. In the illustrated embodiment, the control signal $u_{i,j}(s)$ is indicative of a required change in the pool of radio resources for use in transmissions in the direction i,j.

The control signal $u_{i,j}(s)$ is provided to the scheduler 408, and is used to adjust a pool of radio resources available to the scheduler 408 for the purposes of scheduling transmissions to one or more wireless devices in the direction i,j. Alternatively, the control signal may be used to adjust the rate of change of the pool of radio resources available to the scheduler 408.

In the illustrated embodiment, the control signal is integrated in an integrator 412, which converts the control signal, being indicative of a change (or a rate of change) in the fraction of pool of resources, to a fraction $\gamma_{i,j}(t)$ of the pool of resources. The fraction $\gamma_{i,j}(t)$ is then provided to a limiter 414, which applies one or more limitations to the fraction $\gamma_{i,j}(t)$. For example, the limiter 414 may apply upper and lower limitations to the fraction $\gamma_{i,j}(t)$, to ensure that the fraction $\gamma_{i,j}(t)$ falls within upper and lower values. Thus, if the output of the integrator 412 is greater than the upper value, the limiter 414 limits the fraction to the upper value; if the output of the integrator 412 is less than the lower value, the limiter 414 limits the fraction to the lower value.

The output of the limiter 414 thus represents a limited pool of radio resources available to the scheduler 408 for transmissions in the direction i,j. Thus only a fraction of the total pool of radio resources becomes available to a scheduling algorithm 416, for the allocation of data for transmission to one or more wireless devices in the direction i,j. As noted above, various scheduling algorithms may be utilized, including round robin, fair queuing, proportionally fair scheduling and maximum throughput.

The output of the scheduling algorithm 416 is thus a set of signals to be provided to the radio unit 404, comprising data to be transmitted to one or more wireless devices in the direction i,j utilizing resources selected from the adjusted pool of radio resources. In the illustrated model, these signals are adjusted by the addition of a quantity representative of predicted power errors $w_{i,j}(t)$ in a first adding element 418.

The output of the first adding element 418 is thus representative of the instantaneous output power of the transmission point $P_{tot}(s)$ in the direction i,j. This quantity is provided to the radio unit 404, via the C2 interface, in terms of the data that is scheduled for transmission, where it is averaged in an averaging block 420 to account for the fact that the regulatory RF exposure limit is expressed as a time-averaged value which is related to a time-averaged transmission output power. For example, the averaging block 420 may implement the averaging according to any suitable algorithm or model. In the illustrated embodiment, the averaging block 420 implements an autoregressive simplified model of the averaging $K_{i,j}/(sT+1)$. The output of the averaging block 420 is provided to a second adding element 422, which adds it to a quantity e (s) representative of error in the measurement of the output power. The output of the second adding element 422 is thus equal to the average total output power of the transmission point in the direction i,j $P_{tot})_{i,j}(s)$. This quantity is fed back to the controller 406 for use as described above.

The signal may further be applied to an antenna or an antenna array for transmission from the radio access node.

The average output power of the transmission point in the direction i,j $P_{tot})_{i,j}(s)$ is also provided to on/off logic 410, which serves to enable and disable the feedback control mechanism. For this purpose, the on/off logic 410 may have control interfaces with one or more of the controller 406, the integrator 412, the limiter 414 and the scheduling algorithm 416. For example, when the average output power in the direction i,j is relatively low, far from the maximum averaged regulatory power $\rangle P_{max,regulatory}\rangle$, the control mechanism may be disabled by sending appropriate disabling control signals to one or more of the modules identified above. Conversely, when the average output power is relatively high, close to the maximum averaged regulatory power $\rangle P_{max,regulatory}\rangle$, the control mechanism may be enabled by sending appropriate enabling control signals to one or more of the modules identified above, to ensure that the maximum averaged regulatory power $\rangle P_{max,regulatory}\rangle$ is not exceeded. For example:

The control mechanism may be turned on when $\langle P_{tot}\rangle_{i,j}(t)>\delta_1 P_{max,site}$, and may set $\gamma(t)=1.0$.

The control mechanism may be turned off when $\langle P_{tot}\rangle_{i,j}(t)<\delta_2 P_{max,site}$.

The values may fulfil the following condition: $\delta_2 P_{max,site} \leq \langle P_{tot}\rangle_{i,j}^{ref} \leq \delta_1 P_{max,site}$.

Figure 5:
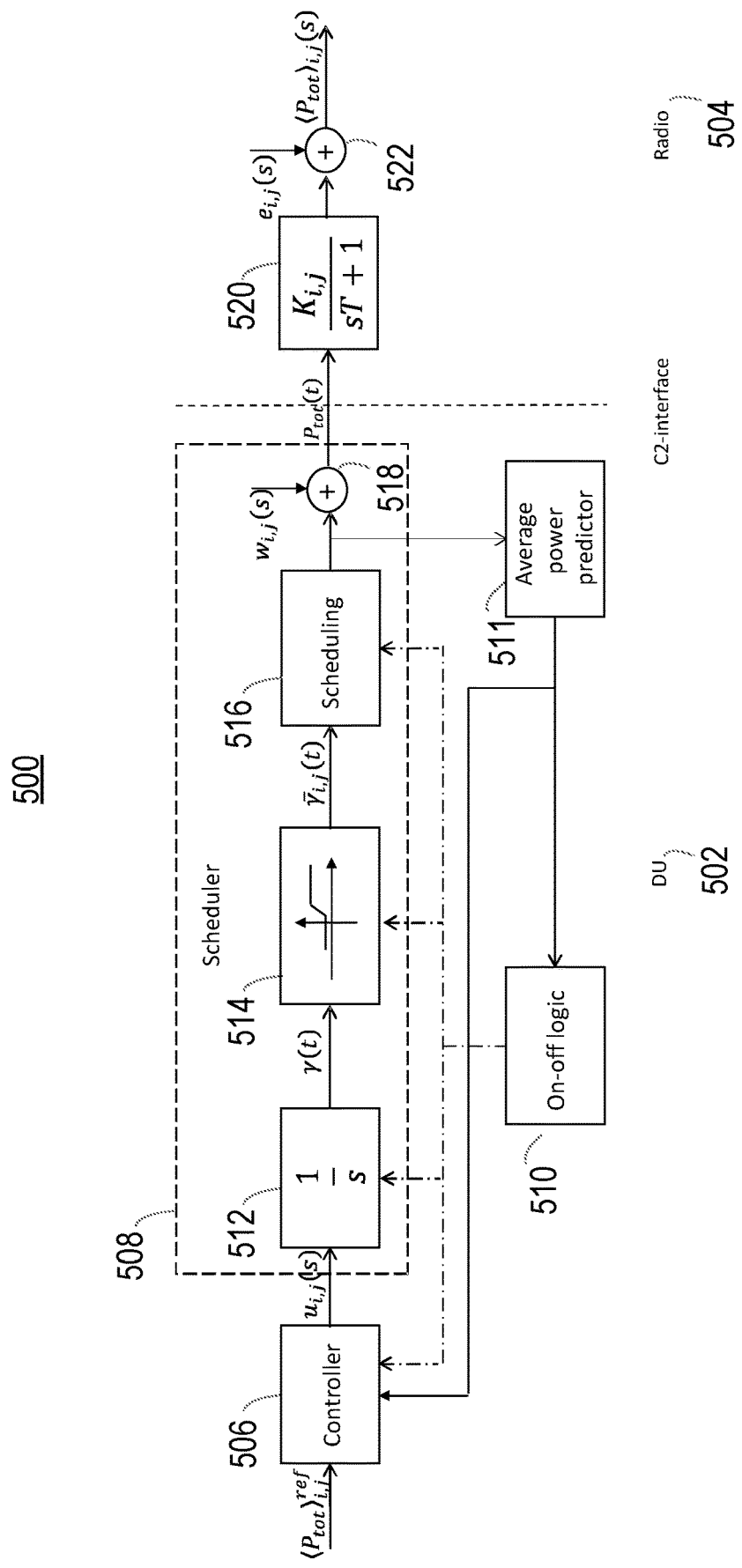
FIG. 5 shows a transmitter arrangement according to further embodiments of the disclosure.

FIG. 5 shows a transmitter arrangement 500 according to further embodiments of the disclosure.

The transmitter arrangement 500 is similar to the arrangement 400 described above with respect to FIG. 4, and therefore will not be described fully herein. However, rather than measuring the transmitter output power, the arrangement 500 predicts the transmitter output power based on an output of the scheduling algorithm 516. Thus the transmitter arrangement 500 additionally comprises an average power predictor 511 coupled to an output of the scheduling algorithm 516.

For example, the estimated output power may be obtained based on the fraction of radio resources (e.g., PRBs) in use at one time, and then averaging this quantity over a period of time. Thus the momentary scheduled power as estimated by the fraction of PRBs used at each time instant may be summed over the time T, and then divided by the time T to obtain the average.

This predicted value is then provided to the on/off logic 510 for the purposes of enabling and disabling the control mechanism, and to the controller 506 for comparison to the output power reference value.

Figure 6:
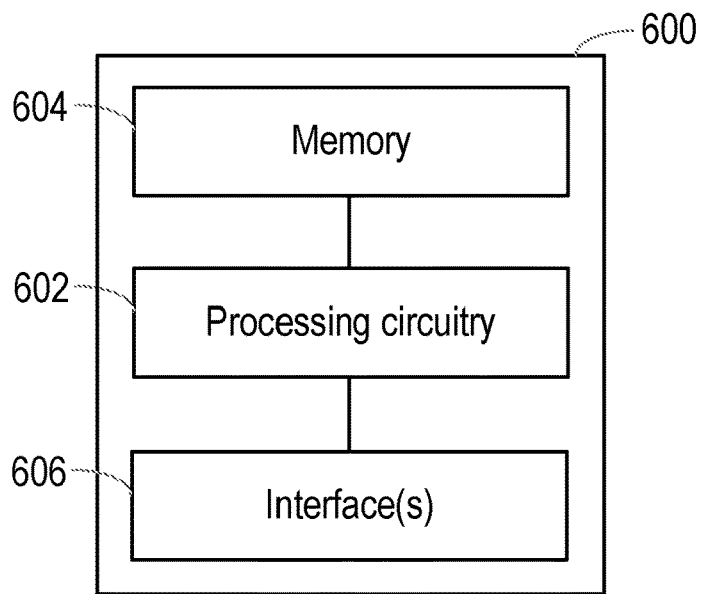
FIG. 6 is a schematic diagram of a network node according to embodiments of the disclosure.

FIG. 6 is a schematic diagram of a network node 600 according to embodiments of the disclosure. The network node 600 may be configured to implement the method described above with respect to FIG. 3, for example. The network node 600 may comprise or be implemented in a radio access node (such as the radio access node 112) of a wireless communications network. Alternatively, the network node 600 may comprise or be implemented in a scheduler communicatively coupled to such a radio access network.

The network node 600 comprises processing circuitry (such as one or more processors) 602 and a non-transitory machine-readable medium 604 (such as memory). The memory may store instructions which, when executed by the processing circuitry 602, cause the network node to: determine an average output power of a transmission point, in a particular direction, over a period of time; compare the average output power to an output power reference value; and allocate data, to be transmitted by the transmission point in the particular direction to one or more wireless devices, to a pool of radio resources. The pool of radio resources is adjusted as a function of the comparison between the average output power and the output power reference value.

The network node 600 may further comprise one or more interfaces 606, for transmitting signals to and/or receiving signals from other network nodes of the wireless communications network. The interfaces 606 may comprise circuitry for the transmission and/or reception of electrical, optical or wireless signals.

The interface(s) 606, processing circuitry 602 and machine-readable medium 602 may be connected together in any suitable manner. In the illustrated embodiment, the components are coupled together directly, in series. In alternative embodiments, the components may be coupled to each other via a system bus or other communication line.

Figure 7:
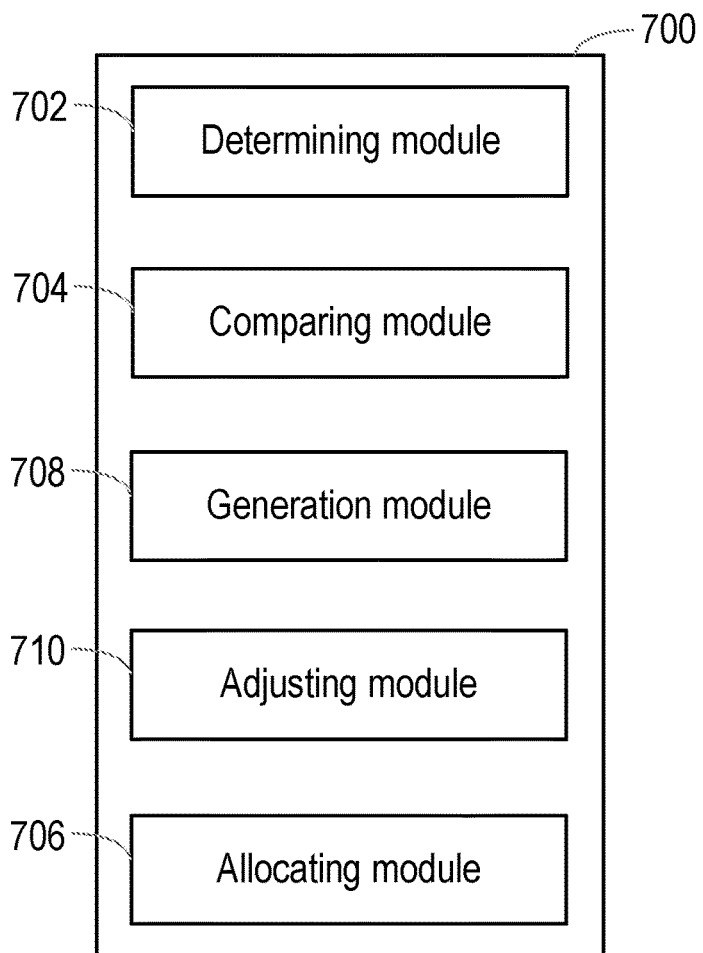
FIG. 7 is a schematic diagram of a network node according to further embodiments of the disclosure.

FIG. 7 is a schematic diagram of a network node 700 according to further embodiments of the disclosure.

The network node 700 may be configured to implement the method described above with respect to FIG. 3, for example. The network node 700 may comprise or be implemented in a radio access node (such as the radio access node 112) of a wireless communications network. Alternatively, the network node 700 may comprise or be implemented in a scheduler communicatively coupled to such a radio access network.

The network node 700 comprises a determining module 702, a comparing module 704 and an allocating module 706. In one embodiment, the determining module 702 may be configured to determine an average output power of a transmission point, in a particular direction, over a period of time. The comparing module 704 may be configured to compare the average output power to an output power reference value. The allocating module 706 may be configured to allocate data, to be transmitted by the transmission point in the particular direction to one or more wireless devices, to a pool of radio resources. The pool of radio resources is adjusted as a function of the comparison between the average output power and the output power reference value.

In the illustrated embodiment, the network node additionally comprises a generation module 708 and an adjusting module 710. The generation module 708 may be configured to generate a control signal based on the output of the comparing module 704. The adjusting module 710 may be configured to adjust the pool of radio resources based on the control signal.

The network node 700 may further comprise one or more interface modules, for transmitting signals to and/or receiving signals from other network nodes of the wireless communications network. The interface modules may comprise circuitry for the transmission and/or reception of electrical, optical or wireless signals.

In one embodiment, the modules of the network node 700 are implemented purely in software. In another embodiment, the modules of the network node 700 are implemented purely in hardware. In a further embodiment, the modules of the network 700 are implemented in a combination of hardware and software.

Thus the disclosure provides methods, apparatus and machine-readable mediums for controlling the transmit output power of a transmission point. In particular, the disclosure provides a mechanism for smoothly varying the transmit output power so that the time-averaged value is below a threshold that has been pre-determined to comply with a regulatory RF exposure requirement.

It should be noted that the above-mentioned embodiments illustrate rather than limit the concepts disclosed herein, and that those skilled in the art will be able to design many alternative embodiments without departing from the scope of the appended following statements and claims. The word "comprising" does not exclude the presence of elements or steps other than those listed in a statement or claim, "a" or "an" does not exclude a plurality, and a single processor or other unit may fulfil the functions of several units recited in the statements. Any reference signs in the statements and claims shall not be construed so as to limit their scope.

The following numbered paragraphs set out embodiments of the disclosure:

1. A method for controlling the output of a transmission point for a wireless communications network, the method comprising:
    determining an average output power of the transmission point, in a particular direction, over a period of time;
    comparing the average output power to an output power reference value; and
    allocating data, to be transmitted by the transmission point in the particular direction to one or more wireless devices, to a pool of radio resources,
    wherein the pool of radio resources is adjusted as a function of the comparison between the average output power and the output power reference value.

2. The method according to embodiment 1, wherein the pool of radio resources is a fraction of a total pool of available radio resources, and wherein the fraction varies as a function of the comparison between the average output power and the output power reference value.

3. The method according to embodiment 1 or 2, wherein the pool of radio resources comprises resources at a plurality of different transmission frequencies.

4. The method according to any one of the preceding embodiments, further comprising:
    generating a control signal based on the comparison between the average output power and the output power reference value, and adjusting the pool of radio resources based on the control signal.

5. The method according to embodiment 4, wherein the controller that generates the control signal implements a proportional-derivative control scheme.

6. The method according to embodiment 5, wherein the control signal comprises a first term which is proportional to a difference between the average output power and the output power reference value.

7. The method according to embodiment 5 or 6, wherein the control signal comprises a second term which is proportional to a time-derivative of the average output power.

8. The method according to embodiment 7, wherein the second term is restricted to values which are equal to or less than zero.

9. The method according to any one of the preceding embodiments, wherein the pool of resources is set to a minimum value responsive to a determination that the average output power is within a proportional threshold of the output power maximum value.

10. The method according to any one of the preceding embodiments, wherein the average output power of the transmission point in the particular direction over a period of time is determined as a function of an average total output power of the transmission point in all directions; a scheduled resource utilization parameter in the particular direction and a main lobe antenna gain; one or more scheduled resource utilization parameters in directions other than the particular direction and a side lobe antenna gain.

11. The method according to embodiment 10, wherein the average total output power of the transmission point in all directions is determined by measuring the amplitudes of radio signals provided to an antenna array of the transmission point.

12. The method according to embodiment 10, wherein the average total output power of the transmission point in all directions is determined by predicting the average total output power of the transmission point over a period of time.

13. The method according to any one of the preceding embodiments, further comprising disabling adjustments to the pool of resources responsive to a determination that the average output power is below a first threshold value.

14. The method according to any one of the preceding embodiments, further comprising enabling adjustments to the pool of resources responsive to a determination that the average output power is above a second threshold value.

15. The method according to embodiment 14 when dependent on embodiment 13, wherein the second threshold value is greater than the first threshold value.

16. A network node configured to perform the method according to any one of the preceding embodiments.

17. A network node for the output of a transmission point for a wireless communications network, the network node comprising processing circuitry and a non-transitory machine-readable medium storing instructions which, when executed by the processing circuitry, cause the network node to:
determine an average output power of the transmission point, in a particular direction, over a period of time;
compare the average output power to an output power reference value; and
allocate data, to be transmitted by the transmission point to one or more wireless devices in the particular direction, to a pool of radio resources,
wherein the pool of radio resources is adjusted as a function of the comparison between the average output power and the output power reference value.

18. The network node according to embodiment 17, wherein the pool of radio resources is a fraction of a total pool of available radio resources, and wherein the fraction varies as a function of the comparison between the average output power and the output power reference value.

19. The network node according to embodiment 17 or 18, wherein the pool of radio resources comprises resources at a plurality of different transmission frequencies.

20. The network node according to any one of embodiments 17 to 19, wherein the network node is further caused to:
generating a control signal based on the comparison between the average output power and the output power reference value, and adjusting the pool of radio resources based on the control signal.

21. The network node according to embodiment 20, wherein the controller that generates the control signal implements a proportional-derivative control scheme.

22. The network node according to embodiment 21, wherein the control signal comprises a first term which is proportional to a difference between the average output power and the output power reference value.

23. The network node according to embodiment 21 or 22, wherein the control signal comprises a second term which is proportional to a time-derivative of the average output power.

24. The network node according to embodiment 23, wherein the second term is restricted to values which are equal to or less than zero.

25. The network node according to any one of embodiments 17 to 24, wherein the pool of resources is set to a minimum value responsive to a determination that the average output power is within a proportional threshold of the output power maximum value.

26. The network node according to any one of embodiments 17 to 25, wherein determining an average output power of the transmission point over a period of time comprises measuring amplitudes of one or more radio signals provided to one of more antenna elements of the transmission point.

27. The network node according to any one of embodiments 17 to 26, wherein the average output power of the transmission point in the particular direction over a period of time is determined as a function of an average total output power of the transmission point in all directions; a scheduled resource utilization parameter in the particular direction and a main lobe antenna gain; and one or more scheduled resource utilization parameters in directions other than the particular direction and a side lobe antenna gain.

28. The network node according to embodiment 27, wherein the average total output power of the transmission point in all directions is determined by measuring the amplitudes of radio signals provided to an antenna array of the transmission point.

29. The network node according to embodiment 27, wherein the average total output power of the transmission point in all directions is determined by predicting the average total output power of the transmission point over a period of time.

30. The network node according to any one of embodiments 17 to 29, wherein the network node is further caused to enable adjustments to the pool of resources responsive to a determination that the average output power is above a second threshold value.

31. The network node according to embodiment 30 when dependent on embodiment 29, wherein the second threshold value is greater than the first threshold value.

32. A network node for the output of a transmission point for a wireless communications network, the network node comprising:

a determining module configured to determine an average output power of the transmission point, in a particular direction, over a period of time;

a comparing module configured to compare the average output power to an output power reference value; and an allocation module configured to allocate data, to be transmitted by the transmission point to one or more wireless devices in the particular direction, to a pool of radio resources, wherein the pool of radio resources is adjusted as a function of the comparison between the average output power and the output power reference value.

33. The network node according to embodiment 32, wherein the pool of radio resources is a fraction of a total pool of available radio resources, and wherein the fraction varies as a function of the comparison between the average output power and the output power reference value.

34. The network node according to embodiment 32 or 33, wherein the pool of radio resources comprises resources at a plurality of different transmission frequencies.

35. The network node according to any one of embodiments 32 to 34, further comprising:

a generating module configured to generate a control signal based on the comparison between the average output power and the output power reference value; and an adjusting module configured to adjust the pool of radio resources based on the control signal.

36. The network node according to embodiment 35, wherein the generating module implements a proportional-derivative control scheme.

37. The network node according to embodiment 36, wherein the control signal comprises a first term which is proportional to a difference between the average output power and the output power reference value.

38. The network node according to embodiment 36 or 37, wherein the control signal comprises a second term which is proportional to a time-derivative of the average output power.

39. The network node according to embodiment 38, wherein the second term is restricted to values which are equal to or less than zero.

40. The network node according to any one of embodiments 32 to 39, wherein the pool of resources is set to a minimum value responsive to a determination that the average output power is within a proportional threshold of the output power maximum value.

41. The network node according to any one of embodiments 32 to 40, wherein the average output power of the transmission point in the particular direction over a period of time is determined as a function of an average total output power of the transmission point in all directions; a scheduled resource utilization parameter in the particular direction and a main lobe antenna gain; one or more scheduled resource utilization parameters in directions other than the particular direction and a side lobe antenna gain.

42. The network node according to embodiment 41, wherein the average total output power of the transmission point in all directions is determined by measuring the amplitudes of radio signals provided to an antenna array of the transmission point.

43. The network node according to embodiment 41, wherein the average total output power of the transmission point in all directions is determined by predicting the average total output power of the transmission point over a period of time.

44. The network node according to any one of embodiments 32 to 43, further comprising a disabling module configured to disable adjustments to the pool of resources responsive to a determination that the average output power is below a first threshold value.

45. The network node according to any one of embodiments 32 to 44, further comprising an enabling module configured to enable adjustments to the pool of resources responsive to a determination that the average output power is above a second threshold value.

46. The network node according to embodiment 45 when dependent on embodiment 44, wherein the second threshold value is greater than the first threshold value.

47. A computer program for performing the method according to any one of embodiments 1 to 15.

48. A computer program product, comprising a computer program according to embodiment 47.

49. A computer program product according to embodiment 48, embodied on a carrier.

APPENDIX

Automatic Control

The following subsection explains the basics of the terminology used. It is stressed that this terminology is part of the prior art in the field of automatic control. A number of representations of a dynamic process may be introduced. A dynamic process is one where the output depends not only on the present input signal but also on previous inputs and outputs. In other words, the dynamic process has memory. The most basic dynamic process is the linear one that can be described by a differential equation as $$y^{(n)} + a_1 y^{(n-1)}(t) + \ldots + a_n y(t) = b_0 u^{(m)}(t) + \ldots b_m u(t).$$

Here y(t) is the output signal, u(t) is the input signal, t is the time, while $a_i$, i=1, ..., n and $b_1$, j=0, ..., m are constant parameters. The superscript $^{(i)}$ denotes differentiation with respect to time i times. The above differential equation has order n. It has one input signal and one output signal. For simplicity all concepts are explained in this context, but those skilled in the art will appreciate that the concepts can be generalized to more than one input signal and/or more than one output signal.

By taking Laplace transforms and setting initial values to zero, the differential equation is transformed to be represented by a transfer function H(s), where s denotes the Laplace transform variable, which is closely related to the angular frequency used in Fourier transforms. The result is $$H(s) = \frac{B(s)}{A(s)} = \frac{b_o s^m + b_1 s^{m+1} + \ldots + b_m}{s^n + a_1 s^{n-1} + \ldots + a_n}.$$

The relationship between the output signal Laplace transform Y(s) and the input signal Laplace transform U(s) is $$Y(s) = H(s)U(s).$$

The poles $p_i$ (where i=1, ..., n) of the process are given by the equation A(s)=0. For simplicity only strictly stable (open loop) processes with all poles in the left complex half plane are considered here. In general, poles can be real or complex conjugate pairs.

The properties of the dynamic process can also be studied in the frequency domain in terms of complex-valued frequency functions Y(jω), H(jω) and U(jω). ω denotes the angular frequency that fulfils $$\omega = 2\pi f,$$

where f is the frequency in Hz. References to frequency hereinafter are to be understood as references to angular frequency.

Figure 8:
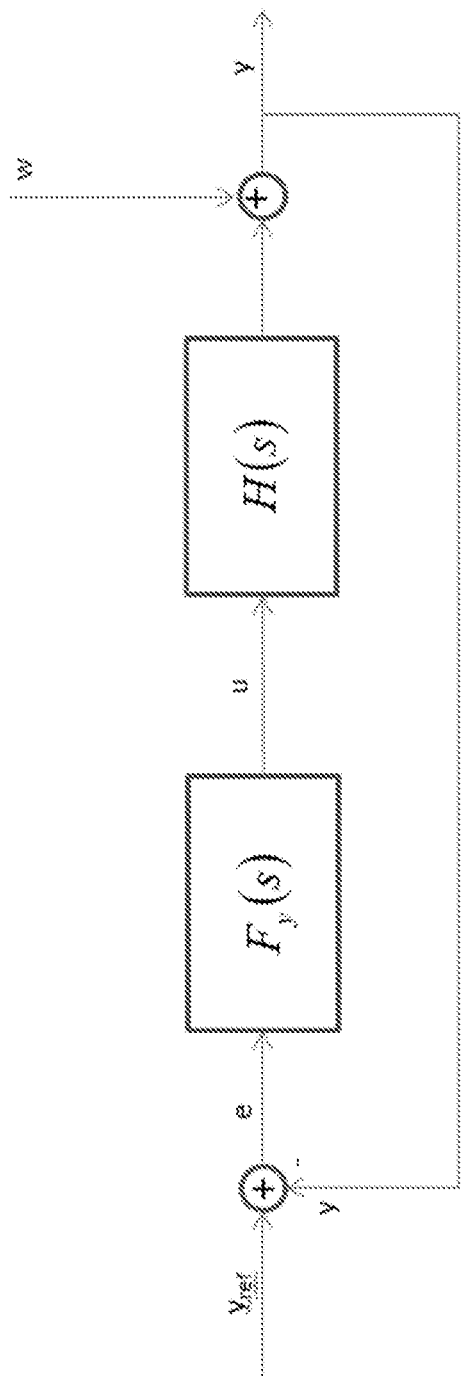
FIG. 8 is a block diagram of an automatic control scheme.

The following definition is best explained with respect to FIG. 8, where $F_y(s)$ is the feedback gain. The closed loop system is then computed as follows $$Y(s)=W(s)+H(s)F_y(s)(Y_{ref}(s)-Y(s)),$$

which gives $$Y(s) = \frac{F_y(s)H(s)}{1+F_y(s)H(s)}Y_{ref}(s) + \frac{1}{1+F_y(s)H(s)}W(s).$$

This gives the effect of the reference signal and the disturbance on the output. The remaining definitions now follow:

The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2.$$

The closed loop static error of the control system is given by the equation $$y_{ref} - y = \frac{1}{1+F_y(0)H(0)}(y_{ref}-w),$$

The static disturbance rejection of the control system is given by the static sensitivity function $$S(0) = \frac{1}{1+F_y(0)H(0)}.$$

The dynamic disturbance rejection of the control system is determined by the sensitivity function $$S(j\omega) = \frac{1}{1+F_y(j\omega)H(j\omega)}$$

The complimentary sensitivity function of the control system, $T(j\omega)=1-S(j\omega)$ determines the robustness of the control system with respect to un-modelled dynamics.

Beamforming Using Codebooks

Beamforming and MIMO transmission is a mature subject today. This section aims at presenting the basics, for a detailed treatment any textbook on digital communications could be consulted.

Figure 9:
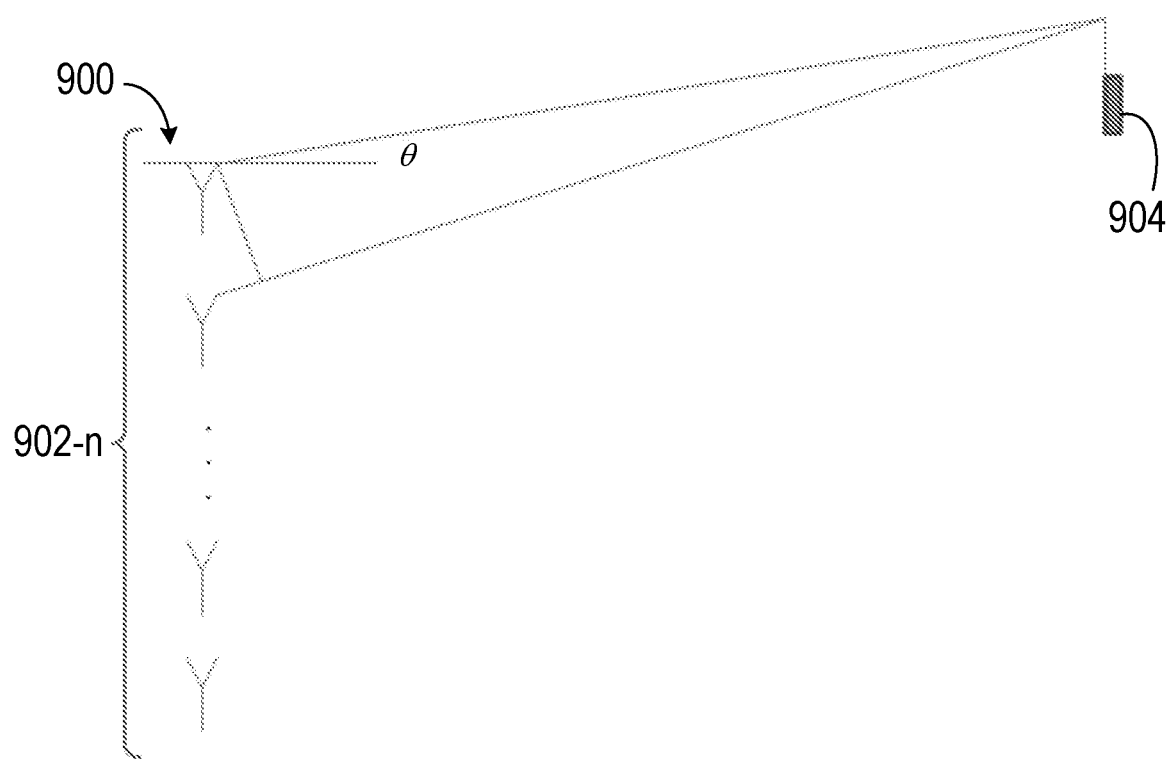
FIG. 9 is a schematic diagram showing beamformed transmissions.

To explain the beamforming concept, consider FIG. 9 which shows an idealized one-dimensional beamforming case, in which an antenna array 900 comprising multiple antenna elements 902-$n$, transmits to a wireless device or UE 904. It is assumed that the UE is located far away from the antenna array, i.e. in the far-field, and thus it follows that the difference in travel distance of radio waves from the base station to the UE, between adjacent antenna elements 902, is $$l=k\lambda\sin(\theta),$$

where $k\lambda$ is the antenna element separation. Here k is the separation factor which may be 0.5-0.7 in a typical correlated antenna element arrangement. This means that if a reference signal $s_i e^{j\omega t}$ transmitted from the ith antenna element will arrive at the UE antenna as a weighted sum $$S_{UE} = \sum_{i=0}^{N-1} s_i h_i e^{j\omega\left(t-\frac{il}{c}\right)} = e^{j\omega t}\sum_{i=0}^{N-1} s_i h_i e^{-2\pi jki\sin(\theta)}.$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the UE therefore needs to search for all complex channel coefficients $h_i$ and the unknown angle $\theta$. For this reason, the standard defines a codebook of beams in different directions given by steering vector coefficients like $$w_{m,i}=e^{-jf(m,i)}$$

where m indicates a directional codebook entry. The UE then tests each codebook and estimates the channel coefficients. The information rate achieved for each codebook entry m is computed and the best one defines the direction and channel coefficients. This is possible since $s_i$, is a known so called pilot signal. The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The feedback information is denoted CSI, for Channel State Information, and it may comprise the CQI (Channel Quality Indication), a quantity directly related to the received signal to noise ratio, the PMI (Pre-code Matrix Index) which is the codebook entry, and the RI (Rank Indication) which expresses the "richness" of the channel which essentially tells how many parallel MIMO channels that can be sustained between the transmitter and receiver at the specific frequency.

The channel matrix can then be used for beamforming computations, or the direction represented by the reported codebook entry can be used directly.

The invention claimed is:

1. A method for controlling an average output power of a directional beam from an antenna array, the directional beam having a main lobe in a particular direction at a transmission point for a wireless communications network, the method comprising:
   determining the average output power of the directional beam in the particular direction, over a period of time;
   comparing the average output power to an output power reference value, wherein the output power reference value is associated with maximum averaged regulatory power to meet a regulatory radio frequency (RF) exposure requirement;
   adjusting allocation of radio resources from a pool of radio resources based on a difference between the average output power and the output power reference value without exceeding a time-averaged power value threshold that complies with the regulatory RF exposure requirement, wherein the radio resources comprise one or more of frequency channels or sub-channels, time frames or slots, and coding; and allocating data, to be transmitted by the directional beam in the particular direction to one or more wireless devices using the adjusted allocation of radio resources.

2. The method of claim 1, wherein the pool of radio resources comprises resources at a plurality of different transmission frequencies.

3. The method of claim 1, further comprising:
generating a control signal based on the comparison between the average output power and the output power reference value, and adjusting the allocation of radio resources based on the control signal.

4. The method of claim 3, wherein a controller that generates the control signal implements a proportional-derivative control scheme.

5. The method of claim 4, wherein the control signal comprises a first term which is proportional to the difference between the average output power and the output power reference value.

6. The method of claim 4, wherein the control signal comprises a second term which is proportional to a time-derivative of the average output power.

7. The method of claim 6, wherein the second term is restricted to values which are equal to or less than zero.

8. The method of claim 1, wherein the allocation of radio resources is set to a minimum value responsive to a determination that the average output power is within a proportional threshold of an output power maximum value.

9. The method of claim 1, wherein the average output power of the directional beam in the particular direction over a period of time is determined as a function of any one of an average total output power of the transmission point in all directions, a scheduled resource utilization parameter in the particular direction and a main lobe antenna gain, and one or more scheduled resource utilization parameters in directions other than the particular direction and a side lobe antenna gain.

10. The method of claim 9, wherein the average total output power of the transmission point in all directions is determined by measuring amplitudes of radio signals provided to the antenna array of the transmission point.

11. The method of claim 9, wherein the average total output power of the transmission point in all directions is determined by predicting the average total output power of the transmission point over a period of time.

12. The method of claim 1, further comprising:
disabling adjustments to the pool of radio resources responsive to a determination that the average output power is below a first threshold value.

13. The method of claim 12, further comprising:
enabling adjustments to the pool of radio resources responsive to a determination that the average output power is above a second threshold value.

14. The method of claim 13, wherein the second threshold value is greater than the first threshold value.

15. A network node for controlling an average output power of a directional beam from an antenna array, the directional beam having a main lobe in a particular direction at a transmission point for a wireless communications network, the network node comprising:
processing circuitry; and
non-transitory machine-readable medium storing instructions which, when executed by the processing circuitry, cause the network node to:
determine the average output power of the directional beam in the particular direction, over a period of time;
compare the average output power to an output power reference value, wherein the output power reference value is associated with maximum averaged regulatory power to meet a regulatory radio frequency (RF) exposure requirement;
adjust allocation of radio resources from a pool of radio resources based on a difference between the average output power and the output power reference value without exceeding a time-averaged power value threshold that complies with the regulatory RF exposure requirement, wherein the radio resources comprise one or more of frequency channels or sub-channels, time frames or slots, and coding; and
allocate data, to be transmitted by the directional beam in the particular direction to one or more wireless devices using the adjusted allocation of radio resources.

16. The network node of claim 15, wherein the allocated radio resources is a fraction of a total pool of available radio resources, and wherein the fraction varies as a function of the comparison between the average output power and the output power reference value.

17. The network node of claim 16, wherein the pool of radio resources comprises resources at a plurality of different transmission frequencies.

18. A non-transitory machine-readable storage medium having stored therein a set of instructions, which when executed by a processor of a computing device cause the computing device to perform operations to control average output power of a directional beam from an antenna array, the directional beam having a main lobe in a particular direction at a transmission point for a wireless communications network, the operations comprising:
determining the average output power of the directional beam in the particular direction, over a period of time;
comparing the average output power to an output power reference value, wherein the output power reference value is associated with maximum averaged regulatory power to meet a regulatory radio frequency (RF) exposure requirement;
adjusting allocation of radio resources from a pool of radio resources based on a difference between the average output power and the output power reference value without exceeding a time-averaged power value threshold that complies with the regulatory RF exposure requirement, wherein the radio resources comprise one or more of frequency channels or sub-channels, time frames or slots, and coding; and
allocating data, to be transmitted by the directional beam in the particular direction to one or more wireless devices using the adjusted allocation of radio resources, to a pool of radio resources, wherein the pool of radio resources.

19. The non-transitory machine-readable storage medium of claim 18, wherein the allocated radio resources is a fraction of a total pool of available radio resources, and wherein the fraction varies as a function of the comparison between the average output power and the output power reference value.

* * * * *